(12) United States Patent
Kido et al.

(10) Patent No.: US 6,844,797 B2
(45) Date of Patent: Jan. 18, 2005

(54) HIGH-FREQUENCY DIELECTRIC CERAMIC MEMBER, DIELECTRIC RESONATOR, DIELECTRIC FILTER, DIELECTRIC DUPLEXER, AND COMMUNICATION DEVICE

(75) Inventors: Shunsuke Kido, Omihachiman (JP); Nobuyuki Sakai, Kyoto (JP); Naokatsu Fujinami, Yokaichi (JP)

(73) Assignee: Murata Manufacturing Co., Ltd. (JP)

( * ) Notice: Subject to any disclaimer, the term of this patent is extended or adjusted under 35 U.S.C. 154(b) by 164 days.

(21) Appl. No.: 10/361,892

(22) Filed: Feb. 11, 2003

(65) Prior Publication Data

US 2003/0164746 A1 Sep. 4, 2003

(30) Foreign Application Priority Data

Feb. 21, 2002 (JP) .................................. 2002-044409

(51) Int. Cl.⁷ ............................. H01P 7/00; C04B 35/46
(52) U.S. Cl. .................... 333/219.1; 333/202; 333/219; 333/134; 501/135
(58) Field of Search .......................... 333/219, 219.1, 333/202, 134; 501/134–136

(56) References Cited

U.S. PATENT DOCUMENTS

5,376,603 A * 12/1994 Hirahara et al. ............ 501/134
6,645,895 B2 * 11/2003 Sato et al. .................. 501/136

FOREIGN PATENT DOCUMENTS

| JP | 61-13326 | 4/1986 |
| JP | 2-252654 | 10/1990 |
| JP | 3-216911 | 9/1991 |
| JP | 6-333421 | 12/1994 |

* cited by examiner

Primary Examiner—Dinh T. Le
(74) Attorney, Agent, or Firm—Dickstein, Shapiro, Morin & Oshinsky, LLP

(57) ABSTRACT

A high-frequency dielectric ceramic member is composed of an oxide ceramic containing Mg, Ba, Re, Ti, and O, wherein Re is at least one element selected from the group consisting of La, Ce, Pr, Nd, Sm, Eu, Dy, and Er. The oxide ceramic is represented by the formula $aMgO\text{-}bBaO\text{-}cRe_2O_n\text{-}(100\text{-}a\text{-}c)TiO_2$, wherein $n=3$ when Re is La, Nd, Sm, Eu, Dy, or Er, $n=11/3$ when Re is Pr, and $n=4$ when Re is Ce, wherein a, b, and c, in mole percent, satisfy the relationships $10.0 \leq a \leq 62.0$, $0 < b \leq 14.0$, and $0 < c \leq 16.5$. A dielectric resonator, a dielectric filter, a dielectric duplexer, and a communication device, each including the high-frequency dielectric ceramic member, are also disclosed.

20 Claims, 5 Drawing Sheets

HIGH-FREQUENCY DIELECTRIC CERAMIC MEMBER, DIELECTRIC RESONATOR, DIELECTRIC FILTER, DIELECTRIC DUPLEXER, AND COMMUNICATION DEVICE

BACKGROUND OF THE INVENTION

1. Field of the Invention

The present invention relates to a high-frequency dielectric ceramic member used in the high-frequency bands, such as microwave and millimeter wave bands, and a dielectric resonator, a dielectric filter, a dielectric duplexer, and a communication device, each including the high-frequency dielectric ceramic member.

2. Description of the Related Art

Dielectric ceramic members are widely used for dielectric resonators, circuit boards, etc., in the high-frequency bands, such as microwave and millimeter wave bands.

For example, with respect to dielectric ceramic members used for mobile communication terminals, in order to miniaturize the mobile communication terminals, dielectric ceramic members having a high relative dielectric constant $\epsilon_r$ and high adhesion strength to plating films are mainly used. Specific examples of dielectric ceramic members mainly used in this application include $BaO$—$Nd_2O_3$—$TiO_2$—$PbO$-based and $BaO$—$Nd_2O_3$—$TiO_2$—$Bi_2O_3$-based dielectric ceramic members with a relative dielectric constant $\epsilon_r$ of 90, and $BaO$—$Nd_2O_3$—$TiO_2$—$PbO$—$Bi_2O_3$-based dielectric ceramic members with a relative dielectric constant $\epsilon_r$ of 110.

However, with recent developments in mobile communication, the frequency bands used have shifted to higher frequency bands with shorter wavelengths, giving rise to a new problem. That is, the axis length of a resonator has become excessively short, resulting in a decrease in the non-loading Q factor.

Consequently, there is a demand for a dielectric ceramic member having a relatively low relative dielectric constant $\epsilon_r$, a high Q factor, a temperature coefficient $\tau_f$ of resonant frequency that is close to 0 ppm/° C. as much as possible, and high adhesion strength to plating films. By using a material in which the relative dielectric constant $\epsilon_r$ can be adjusted while controlling the temperature coefficient $\tau_f$ of resonant frequency in the vicinity of 0 ppm/° C., it is possible to provide much more freedom in the design of elements. Therefore, development of such a dielectric ceramic member is also desired.

Hitherto, the following dielectric ceramic members are disclosed.

Japanese Unexamined Patent Application Publication No. 3-216911 discloses a dielectric ceramic member which is composed of a $(BaO, MgO)$—$Re_2O_3$—$TiO_2$-based material, wherein Re is a lanthanide rare-earth element, 50 mole percent or less of BaO being replaced with MgO (first conventional technique). By replacing BaO with MgO in this way, the temperature coefficient $\tau_f$ characteristics can be improved without greatly changing the relative dielectric constant $\epsilon_r$ or the Q factor.

Japanese Unexamined Patent Application Publication No. 2-252654 discloses a dielectric ceramic member with a composition of $BaO$—$TiO_2$—$Y_2O_3$—$Sm_2O_3$—$MnO_2$—$MgO$ (second conventional technique). The dielectric ceramic member has a relative dielectric constant $\epsilon_r$ of 39 to 44, thus exhibiting satisfactory dielectric characteristics.

Japanese Examined Patent Application Publication No. 61-13326 discloses a dielectric ceramic member composed of a $ZrO$—$SnO_2$—$TiO_2$-based material (third conventional technique). The dielectric ceramic member has a relative dielectric constant $\epsilon_r$ of 30 to 40, thus exhibiting satisfactory dielectric characteristics.

However, the first to third conventional techniques described above have the following problems to be solved.

In the first conventional technique, since the MgO content is low and the $Re_2O_3$ content is high, a sufficiently high Q factor is not obtained and the temperature coefficient $\tau_f$ is unsuitable for practical use.

In the second conventional technique, although the temperature coefficient $\tau_f$ is in the vicinity of 0 ppm/° C., the MgO content is low (i.e., equal to or less than 1 mole percent), and the relative dielectric constant $\epsilon_r$ is substantially fixed at approximately 40.

In the third conventional technique, although satisfactory dielectric characteristics are exhibited, the adhesion strength to plating films is low.

SUMMARY OF THE INVENTION

It is an object of the present invention to provide a high-frequency dielectric ceramic member which can solve the various problems associated with the conventional techniques described above.

It is another object of the present invention to provide a dielectric resonator, a dielectric filter, a dielectric duplexer, and a communication device, each including the high-frequency dielectric ceramic member.

In one aspect of the present invention, a high-frequency dielectric ceramic member is composed of an oxide ceramic containing Mg, Ba, Re, Ti, and O, wherein Re is at least one element selected from the group consisting of La, Ce, Pr, Nd, Sm, Eu, Dy, and Er. The oxide ceramic is represented by the formula $aMgO\text{-}bBaO\text{-}cRe_2O_n\text{-}(100\text{-}a\text{-}b\text{-}c)TiO_2$, wherein $n=3$ when Re is La, Nd, Sm, Eu, Dy, or Er, $n=11/3$ when Re is Pr, and $n=4$ when Re is Ce, wherein a, b, and c, in mole percent, satisfy the relationships $10.0 \leq a \leq 62.0$, $0 < b \leq 14.0$, and $0 < c \leq 16.5$.

Preferably, a, b, and c, in mole percent, satisfy the relationships $14.3 \leq a \leq 57.0$, $0.7 \leq b \leq 9.0$, and $0.7 \leq c \leq 10.0$.

In another aspect of the present invention, a dielectric resonator includes a dielectric ceramic member and an input-output terminal, the dielectric resonator operating by electromagnetic coupling between the dielectric ceramic member and the input-output terminal, wherein the dielectric ceramic member is composed of the high-frequency dielectric ceramic member of the present invention described above.

Preferably, in the dielectric resonator, the input-output terminal is composed of a plated copper conductor disposed on a surface of the dielectric ceramic member.

In another aspect of the present invention, a dielectric filter includes the dielectric resonator described above and external coupling means connected to the input-output terminal of the dielectric resonator.

In another aspect of the present invention, a dielectric duplexer includes at least two dielectric filters, input-output connectors connected to the respective dielectric filters, and an antenna connector connected to all the dielectric filters, wherein at least one of the dielectric filters is the dielectric filter of the present invention described above.

In another aspect of the present invention, a communication device includes the dielectric duplexer described above, a transmitter circuit connected to at least one of the input-output connectors of the dielectric duplexer, a receiver circuit connected to at least one of the input-output connectors of the dielectric duplexer that is not connected to the transmitter circuit, and an antenna connected to the antenna connector of the dielectric duplexer.

Other features, elements, characteristics and advantages of the present invention will become more apparent from the following details description of preferred embodiments of the present invention with reference to the attached drawings.

DATAILED DESCRIPTION OF THE PREFERRED EMBODIMENTS

First, a dielectric resonator, a dielectric filter, a dielectric duplexer, and a communication device, to which a high-frequency dielectric ceramic member of the present invention is applicable, will be described below.

Figure 1:
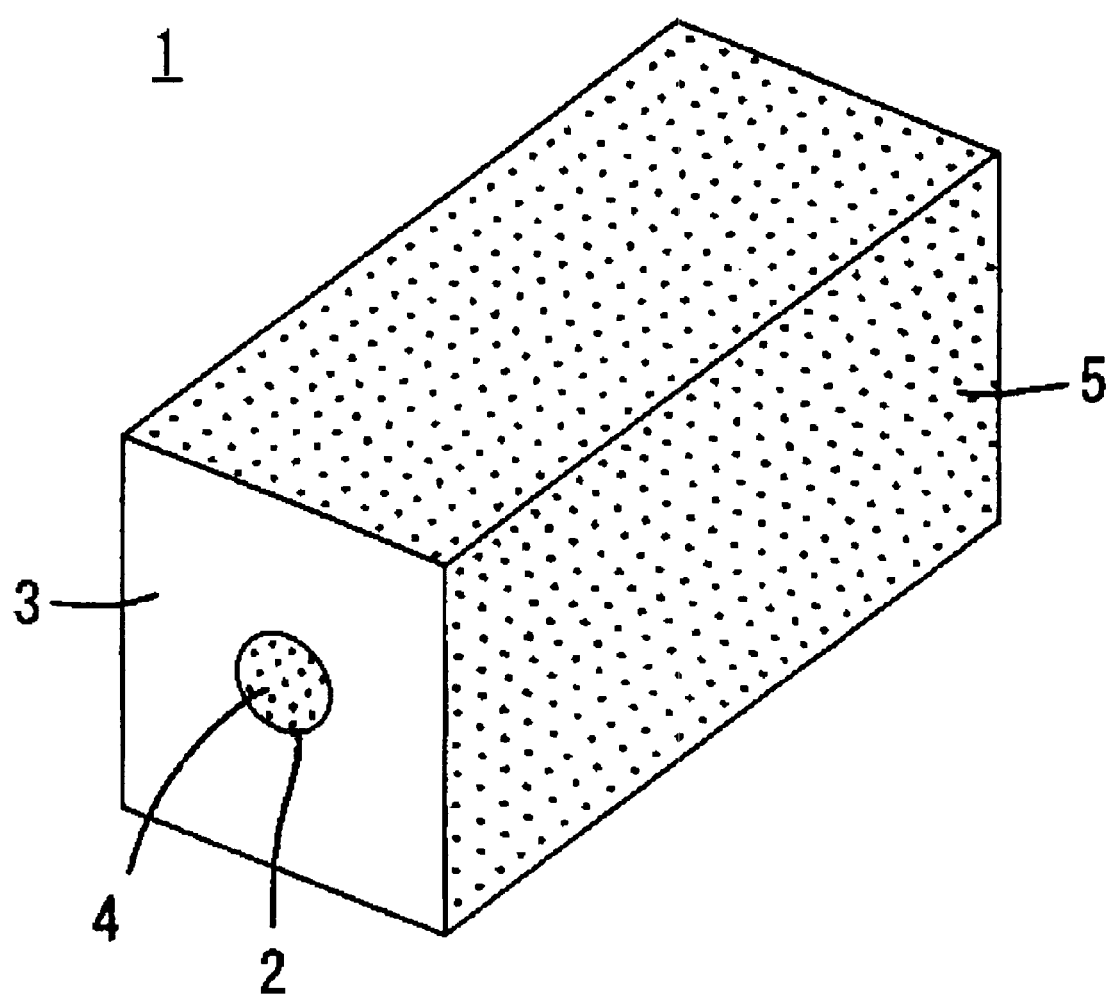
FIG. 1 is a perspective view of a dielectric resonator including a high-frequency dielectric ceramic member in accordance with the present invention.
Figure 2:
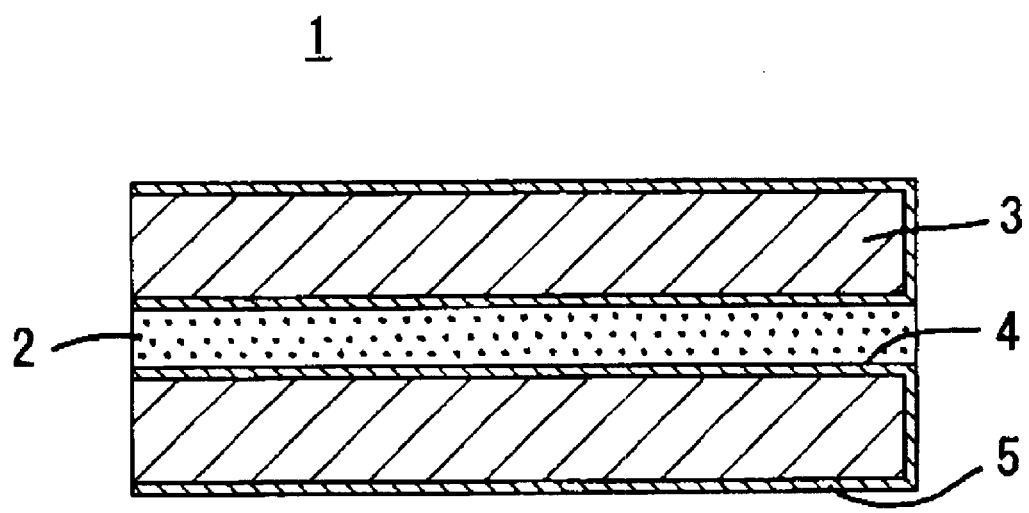
FIG. 2 is a longitudinal sectional view of the dielectric resonator shown in FIG. 1, taken along the centerline.

FIG. 1 is a perspective view of a dielectric resonator 1 including a high-frequency dielectric member of the present invention, and FIG. 2 is a longitudinal sectional view of the dielectric resonator 1 shown in FIG. 1, taken along the centerline.

The dielectric resonator 1 includes a rectangular columnar dielectric ceramic member 3 provided with a through-hole 2. An internal conductor 4 is formed on the interior surface of the through-hole 2, and an external conductor 5 is formed on the exterior surface of the dielectric ceramic member 3.

The dielectric resonator 1 works by electromagnetically coupling an input-output terminal, i.e., an external coupling means, with the dielectric ceramic member 3.

The dielectric ceramic member 3 of the dielectric resonator 1 is composed of the high-frequency dielectric ceramic member of the present invention.

The internal conductor 4 and the external conductor 5 are preferably composed of plated copper films. Consequently, productivity is improved and the production costs are reduced.

The plated copper films are formed, for example, by electroless plating. As will be obvious from the examples described below, the high-frequency dielectric ceramic member of the present invention provides high adhesion strength to such plated copper films. More specifically, when the adhesion strength to the plating films is measured by a "plating adhesion test" according to Japanese Industrial Standard (JIS) H 8504, the high-frequency dielectric ceramic member of the present invention provides an adhesion strength of 70 N or more per square with a side of 2 mm, which is sufficient for practical use.

Although the dielectric resonator 1 shown in FIG. 1 includes the rectangular columnar dielectric ceramic member 3 and is an example of TEM mode dielectric resonators, the high-frequency dielectric ceramic member of the present invention is also applicable to dielectric ceramic members of other shapes and to other TEM mode dielectric resonators, TM mode dielectric resonators, TE mode dielectric resonators, etc.

Figure 3:
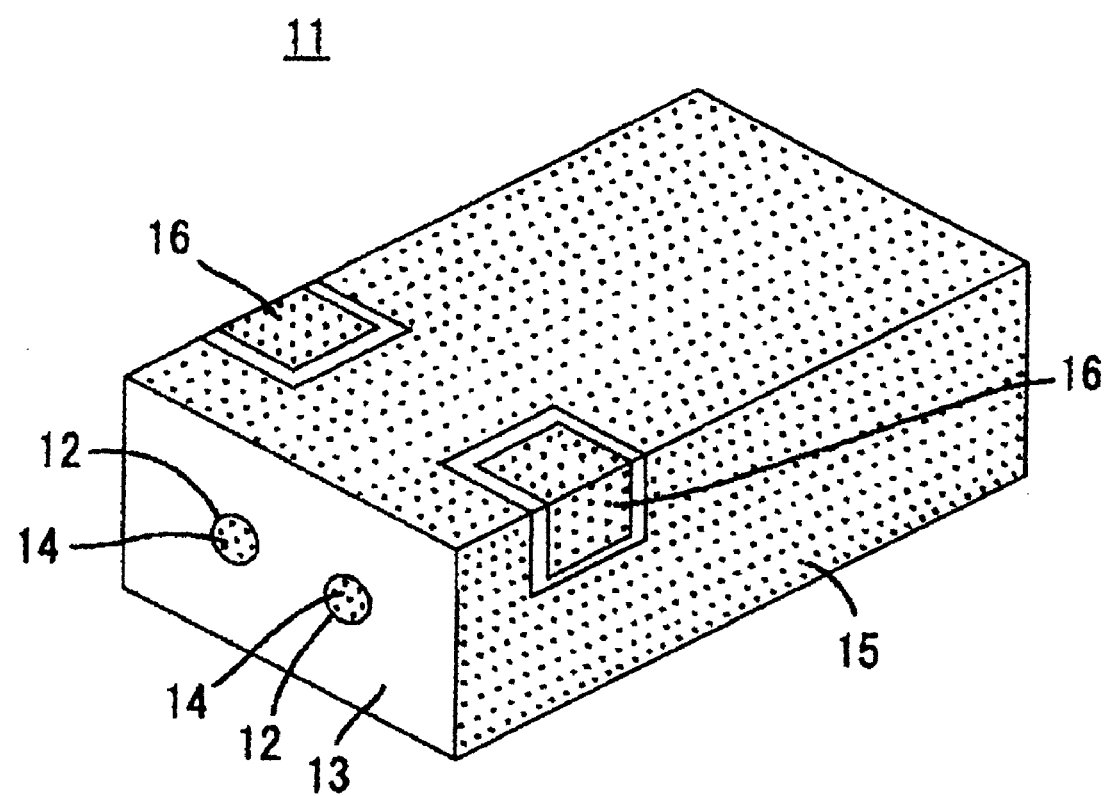
FIG. 3 is a perspective view of a dielectric filter including a high-frequency dielectric ceramic member in accordance with the present invention.

FIG. 3 is a perspective view of a dielectric filter including a high-frequency dielectric ceramic member of the present invention.

A dielectric filter 11 shown in FIG. 3 includes a dielectric ceramic member 13 provided with through-holes 12. Internal conductors 14 composed of plated copper films are formed on the interior surfaces of the through-holes 12 of the dielectric ceramic member 13, and an external conductor 15 composed of a plated copper film is formed on the exterior surface of the dielectric ceramic member 13.

The dielectric ceramic member 13, the internal conductors 14, and the external conductor 15 constitute a dielectric resonator, and external coupling means 16 are formed on the dielectric resonator. The dielectric filter 11 is thereby fabricated.

In the dielectric filter 11, the dielectric ceramic member 13 is composed of a high-frequency dielectric ceramic member of the present invention.

Although the dielectric filter 11 shown in FIG. 3 is a chip dielectric filter, the high-frequency dielectric ceramic member of the present invention is also applicable to a discrete dielectric filter.

Figure 4:
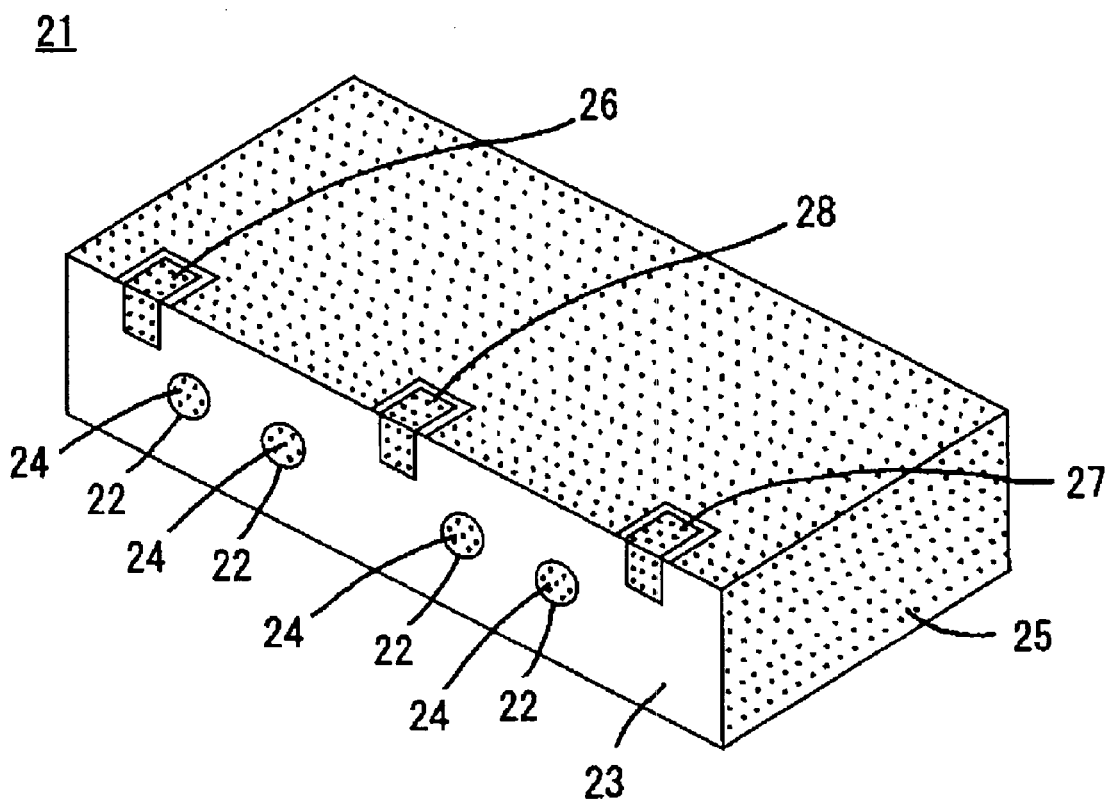
FIG. 4 is a perspective view of a dielectric duplexer including a high-frequency dielectric ceramic member in accordance with the present invention.

FIG. 4 is a perspective view of a dielectric duplexer including a high-frequency dielectric ceramic member of the present invention.

A dielectric duplexer 21 shown in FIG. 4 includes a dielectric ceramic member 23 provided with through-holes 22. Internal conductors 24 composed of plated copper films are formed on the interior surfaces of the through-holes 22, and an external conductor 25 composed of a plated copper film is formed on the exterior surface of the dielectric ceramic member 23.

The dielectric ceramic member 23, the internal conductors 24, and the external conductor 25 constitute two dielectric filters provided with dielectric resonators. The dielectric duplexer 21 also includes an input connector 26 connected to one of the dielectric filters, an output connector 27 connected to the other dielectric filter, and an antenna connector 28 connected to and shared by the dielectric filters.

In the dielectric duplexer 21, the dielectric ceramic member 23 is composed of a high-frequency dielectric ceramic member of the present invention.

Although the dielectric duplexer 21 shown in FIG. 4 is a block-type dielectric duplexer, the high-frequency dielectric ceramic member of the present invention is also applicable to a discrete dielectric duplexer. In the discrete dielectric duplexer, all of the dielectric filters included therein are not necessarily composed of the high-frequency dielectric ceramic members of the present invention. That is, at least one dielectric filter therein must be composed of the high-frequency dielectric ceramic member of the present invention.

Figure 5:
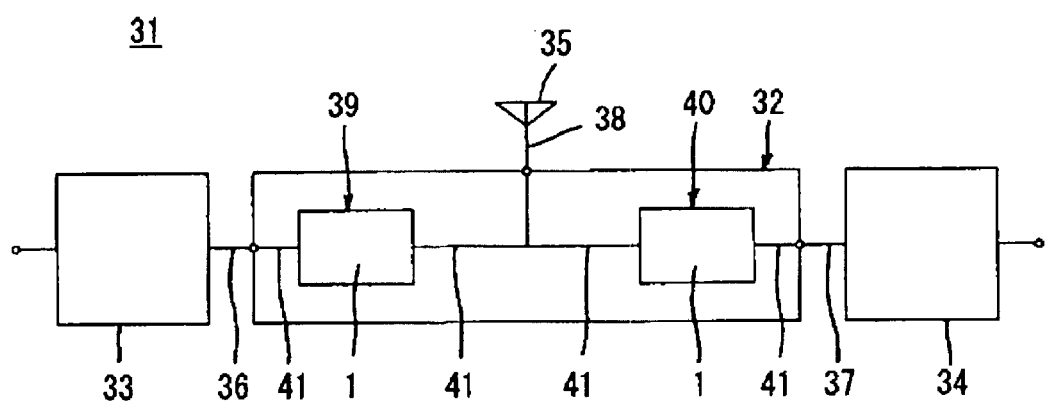
FIG. 5 is a block diagram showing a communication device including the dielectric resonator shown in FIG. 1.

FIG. 5 is a block diagram showing a communication device including a dielectric duplexer such as the one shown in FIG. 4.

A communication device 31 includes a dielectric duplexer 32, a transmitter circuit 33, a receiver circuit 34, and an antenna 35.

The transmitter circuit 33 is connected to an input connector 36 of the dielectric duplexer 32, and the receiver circuit 34 is connected to an output connector 37 of the dielectric duplexer 32. The antenna 35 is connected to an antenna connector 38 of the dielectric duplexer 32.

The dielectric duplexer 32 includes dielectric filters 39 and 40. Each of the dielectric filters 39 and 40 includes a dielectric resonator and external coupling means connected thereto. In the embodiment shown in FIG. 5, for example, each of the dielectric filters 39 and 40 includes the dielectric resonator 1 shown in FIG. 1 and external coupling means 41 connected thereto. The dielectric filter 39 is connected between the input connector 36 and the dielectric filter 40, and the dielectric filter 40 is connected between the dielectric filter 39 and the output connector 37.

Next, the high-frequency dielectric ceramic member of the present invention which is preferably used for the dielectric ceramic member 3 shown in FIG. 1, the dielectric ceramic member 13 shown in FIG. 3, the dielectric ceramic member 23 shown in FIG. 4, etc., will be described below.

The high-frequency dielectric ceramic member of the present invention is composed of an oxide ceramic containing Mg, Ba, Re, Ti, and O, wherein Re is at least one element selected from the group consisting of La, Ce, Pr, Nd, Sm, Eu, Dy, and Er. The oxide ceramic is represented by the formula $aMgO\text{-}bBaO\text{-}cRe_2O_n\text{-}(100\text{-}a\text{-}b\text{-}c)TiO_2$, wherein n=3 when Re is La, Nd, Sm, Eu, Dy, or Er, n=11/3 when Re is Pr, and n=4 when Re is Ce, wherein a, b, and c, in mole percent, satisfy the relationships $10.0 \leq a \leq 62.0$, $0 < b \leq 14.0$, and $0 < c \leq 16.5$.

The relationship $10.0 \leq a \leq 62.0$ is defined because, if a exceeds 62.0 mole percent, the temperature coefficient $\tau_f$ of resonant frequency is excessively decreased to a negative value, and if a is less than 10.0 mole percent, the Q factor is decreased.

The relationship $0 < b \leq 14.0$ is defined because, if b exceeds 14.0 mole percent, the Q factor is decreased, and if b is 0 mole percent, the temperature coefficient $\tau_f$ of resonant frequency is excessively decreased to a negative value.

The relationship $0 < c \leq 16.5$ is defined because, if c exceeds 16.5 mole percent, the Q factor is decreased drastically, resulting in problems in practical use, and if c is 0 mole percent, the temperature coefficient $\tau_f$ of resonant frequency is excessively decreased to a negative value.

The reason for limiting Re, as a lanthanide rare-earth element in $Re_2O_n$, to at least one element selected from the group consisting of La, Ce, Pr, Nd, Sm, Eu, Dy, and Er is that, by incorporating an appropriate amount of any one of the lanthanide rare-earth elements, it is possible control the temperature coefficient $\tau_f$ of resonant frequency in the vicinity of 0 ppm/° C. arbitrarily while setting the relative dielectric constant $\epsilon_r$ in the range of 17 to 75.

As described above, in accordance with the high-frequency dielectric ceramic member of the present invention, a high Q factor can be obtained while setting the relative dielectric constant $\epsilon_r$ in the range of 17 to 75, and the temperature coefficient $\tau_f$ of resonant frequency can also be decreased. Furthermore, a plating film with high adhesion strength can be formed.

Preferably, in the formula, a, b, and c, in mole percent, satisfy the relationships $14.3 \leq a \leq 57.0$, $0.7 \leq b \leq 9.0$, and $0.7 \leq c \leq 10.0$.

By further specifying the ranges for a, b, and c, as described above, the Q factor can be further increased, and the temperature coefficient $\tau_f$ of resonant frequency can be further decreased.

The high-frequency dielectric ceramic member of the present invention is a sintered member obtained by firing a calcine having a predetermined composition. In order to produce the calcine, all of the starting materials for the high-frequency dielectric ceramic member may be mixed and calcined. Alternatively, parts of the starting materials for the high-frequency dielectric ceramic member, for example, at least parts of MgO and $TiO_2$ may be formulated, mixed, and calcined to produce a first calcine; the rest of the starting materials may be then formulated, mixed, and calcined to produce a second calcine; and the first and second calcines may be pulverized and mixed to obtain the calcine. In either case, satisfactory characteristics can be obtained.

The dielectric ceramic member of the present invention may contain the composition described above as a primary ingredient and may also contain Ca, Sr, Ta, Nb, Zr, Mn, Fe, Si, Cu, Zn, Al, Bi, Y, Pb, and B as additives. Although the amount of the additive depends on its type, the content of such additives converted into CaO, SrO, $Ta_2O_5$, $Nb_2O_5$, $ZrO_2$, MnO, $Fe_2O_3$, $SiO_2$, CuO, ZnO, $Al_2O_3$, $Bi_2O_3$, $Y_2O_3$, PbO, and $B_2O_3$, respectively, may be approximately 5% by weight or less. For example, if 0.5 parts by weight or less of $SiO_2$ is added to the primary ingredient, the sintering temperature can be decreased, thus facilitating the formation of the dielectric ceramic member.

Even if hydroxides, carbonates, oxalate salts, alkoxides, or the like are used, instead of the oxides, as the starting materials (raw materials) for the dielectric ceramic member, the same characteristics can be obtained.

Experiments were carried out as described below in order to confirm the effects obtained by the high-frequency dielectric ceramic members of the present invention.

EXAMPLE 1

As starting materials for dielectric ceramic members, MgO, $BaCO_3$, $La_2O_3$, $CeO_2$, $Pr_6O_{11}$, $Nd_2O_3$, $Sm_2O_3$, $Eu_2O_3$, $Gd_2O_3$, $Dy_2O_3$, $Er_2O_3$, and $TiO_2$ powders were prepared.

The above starting material powders were formulated and mixed so as to satisfy the compositions shown in Tables 1 to 3. The mixtures were calcined in air at 1,000 to 1,200° C. for 1 hour or more. The resultant calcines are pulverized and mixed, and an organic binder was added to each calcine.

In Tables 1 to 3, the amounts of MgO, BaO, $Re_2O_n$, and $TiO_2$ in the composition column are shown in mole percent. In the Re column, Re elements used are shown, and with respect to the samples in which two or more Re elements were used, the mixture ratio is shown in molar ratio.

Each of the calcines to which the organic binder was added was formed into a cylinder with a diameter of 15 mm and a thickness of 7.5 mm, and firing was performed in air at 1,200 to 1,400° C. A cylindrical sintered member was thereby obtained.

With respect to each sample, the cylindrical sintered member was cut to a predetermined size. The relative dielectric constant $\epsilon_r$ and the Q factor at 25° C. and at a test frequency of approximately 3 to 7 GHz were measured, and the temperature coefficient $\tau_f$ of resonant frequency was also measured. The results thereof are shown in Tables 1 to 3.

TABLE 1

| Sample No. | Composition (mole %) | | | | Re (Molar ratio) | $\epsilon_r$ | $\tau_f$ [ppm/° C.] | Q |
|---|---|---|---|---|---|---|---|---|
| | MgO a | BaO b | $Re_2O_n$ c | $TiO_2$ | | | | |
| 1 ∆ | 62.0 | 0.6 | 0.7 | 36.7 | La | 17 | −30 | 10,080 |
| 2 ∆ | 48.3 | 0.7 | 0.5 | 50.5 | La | 19 | −25 | 29,800 |
| 3 ∆ | 48.0 | 0.6 | 0.7 | 50.7 | La | 19 | −17 | 25,300 |
| 4 ∆ | 40.3 | 0.4 | 0.6 | 58.7 | La | 19 | −26 | 29,400 |
| 5 | 57.0 | 1.2 | 1.4 | 40.4 | La0.5, Pr0.5 | 19 | −8 | 10,500 |
| 6 | 46.5 | 1.3 | 1.1 | 51.1 | La0.5, Pr0.5 | 21 | −13 | 31,300 |
| 7 | 46.0 | 1.2 | 1.4 | 51.4 | La0.5, Pr0.5 | 21 | −3 | 26,800 |
| 8 | 38.4 | 0.7 | 1.6 | 59.3 | La0.5, Pr0.5 | 21 | −12 | 19,500 |
| 9 | 38.3 | 1.0 | 1.5 | 59.2 | La0.5, Pr0.5 | 22 | −12 | 26,700 |
| 10 | 42.1 | 3.1 | 2.4 | 52.4 | Nd0.5, Ce0.5 | 25 | 2 | 18,200 |
| 11 | 49.7 | 2.4 | 4.1 | 43.8 | Nd | 25 | −15 | 10,500 |
| 12 | 45.8 | 3.2 | 3.8 | 47.2 | Nd | 26 | 0 | 13,300 |
| 13 | 39.3 | 2.9 | 3.9 | 53.9 | Nd0.75, Sm0.25 | 27 | −12 | 25,400 |
| 14 | 39.2 | 3.2 | 3.8 | 53.8 | Nd0.75, Sm0.25 | 28 | −7 | 25,100 |
| 15 | 28.8 | 3.2 | 3.8 | 64.2 | Nd | 28 | −7 | 23,200 |

TABLE 2

| Sample No. | Composition (mole %) | | | | Re (Molar ratio) | $\epsilon_r$ | $\tau_f$ [ppm/° C.] | Q |
|---|---|---|---|---|---|---|---|---|
| | MgO a | BaO b | $Re_2O_n$ c | $TiO_2$ | | | | |
| 16 | 26.1 | 3.4 | 3.7 | 66.8 | Nd | 30 | 10 | 14,300 |
| 17 | 38.9 | 4.1 | 3.5 | 53.5 | Nd0.5, Ce0.5 | 29 | 14 | 14,100 |
| 18 | 36.7 | 3.1 | 5.1 | 55.1 | Nd0.75, Sm0.26 | 30 | −13 | 18,800 |
| 19 | 36.5 | 4.1 | 4.7 | 54.7 | Nd0.75, Sm0.25 | 31 | 4 | 21,300 |
| 20 | 32.3 | 3.3 | 7.2 | 57.2 | Nd | 33 | 5 | 10,900 |
| 21 | 42.3 | 4.9 | 6.5 | 46.3 | Nd0.5, Sm0.5 | 34 | −1 | 9,500 |
| 22 | 21.1 | 6.5 | 5.9 | 66.5 | Sm | 39 | 10 | 10,500 |
| 23 | 32.0 | 5.4 | 6.3 | 56.3 | Nd0.5, Sm0.5 | 36 | 10 | 17,300 |
| 24 | 29.6 | 7.6 | 6.4 | 56.4 | Nd0.25, Dy0.75 | 40 | 5 | 9,000 |
| 25 | 28.3 | 6.5 | 7.6 | 57.6 | Nd0.25, Sm0.75 | 41 | 7 | 15,100 |
| 26 ∆ | 27.4 | 5.4 | 10.2 | 57.0 | Nd0.5, Sm0.5 | 42 | −18 | 8,800 |
| 27 | 33.6 | 7.4 | 8.7 | 50.3 | Nd0.25, Er0.75 | 43 | 14 | 9,100 |
| 28 | 24.0 | 6.0 | 10.0 | 60.0 | Nd0.5, Eu0.5 | 44 | 5 | 11,500 |
| 29 | 24.1 | 7.3 | 9.3 | 59.3 | Nd0.25, Sm0.75 | 45 | −3 | 14,000 |
| 30 | 14.3 | 8.5 | 10.0 | 67.2 | Nd0.25, Sm0.75 | 52 | −5 | 12,900 |

TABLE 3

| Sample No. | Composition (mole %) | | | | Re (Molar ratio) | $\epsilon_r$ | $\tau_f$ [ppm/° C.] | Q |
|---|---|---|---|---|---|---|---|---|
| | MgO a | BaO b | $Re_2O_n$ c | $TiO_2$ | | | | |
| 31 | 17.8 | 9.0 | 9.8 | 63.4 | Nd0.5, Gd0.5 | 51 | 15 | 12,100 |
| 32 ∆ | 20.3 | 9.9 | 11.6 | 58.2 | Nd0.25, Sm0.5, Gd0.25 | 57 | 5 | 8,600 |
| 33 ∆ | 15.3 | 12.2 | 11.2 | 61.3 | Nd0.25, Sm0.5, Dy0.25 | 62 | 11 | 7,760 |
| 34 ∆ | 13.7 | 10.9 | 12.7 | 62.7 | Nd0.25, Sm0.5, Er0.25 | 63 | 8 | 8,900 |
| 35 ∆ | 10.7 | 8.2 | 16.5 | 64.6 | Nd0.25, Sm0.75 | 63 | 0 | 6,000 |
| 36 ∆ | 12.4 | 13.3 | 12.2 | 62.1 | Nd0.25, Sm0,75 | 67 | 15 | 7,300 |
| 37 ∆ | 10.0 | 12.0 | 14.0 | 64.0 | Nd0.25, Sm0.75 | 69 | 13 | 6,800 |
| 38 ∆ | 10.0 | 14.0 | 13.9 | 62.1 | Nd0.25, Sm0.75 | 75 | 21 | 7,800 |
| 39 * | 63.9 | 0.6 | 0.7 | 34.8 | La | 17 | −35 | 7,900 |
| 40 * | 40.7 | 1.0 | 0.0 | 58.3 | — | 19 | −52 | 62,000 |
| 41 * | 40.7 | 0.0 | 1.0 | 58.3 | La | 22 | −36 | 6,000 |
| 42 * | 10.2 | 7.0 | 17.5 | 65.3 | Nd0.25, Sm.75 | 57 | −3 | 4,100 |
| 43 * | 9.0 | 9.0 | 13.0 | 69.0 | Nd0.25, Sm0.75 | 72 | 26 | 5,900 |
| 44 * | 10.2 | 15.0 | 13.7 | 61.1 | Nd0.25, Sm0.75 | 76 | 24 | 14,800 |

In Tables 1 to 3, the asterisk in the Sample No. column indicates that the sample is out of the ranges of the present invention, and the triangle in the Sample No. column indicates that, although the sample is within the ranges of the present invention, the sample is out of the preferable ranges.

As shown in Tables 1 to 3, in particular, in Table 3, when a is greater than 62.0 mole percent, as in the case of Sample No. 39, the temperature coefficient $\tau_f$ of resonant frequency is excessively decreased to a negative value. On the other hand, when a is less than 10.0 mole percent, as in the case of Sample No. 43, the Q factor is decreased.

When b is greater than 14.0 mole percent, as in the case of Sample No. 44, the Q factor is decreased. On the other hand, when b is equal to 0 mole percent, as in the case of Sample No. 41, the temperature coefficient $\tau_f$ of resonant frequency is an excessive negative value.

When c is greater than 16.5 mole percent, as in the case of Sample No. 42, the Q factor is decreased drastically to such a degree that problems arise in practical use. On the other hand, when c is equal to 0 mole percent, as in the case of Sample No. 40, the temperature coefficient $\tau_f$ of resonant frequency is an excessive negative value.

In contrast, with respect to Sample Nos. 1 to 38 in Tables 1 to 3, since a, b, and c, in mole percent, satisfy the relationships $10.0 \leq a \leq 62.0$, $0 < b \leq 14.0$, and $0 < c \leq 16.5$ in the composition represented by the formula $aMgO\text{-}bBaO\text{-}cRe_2O_n\text{-}(100\text{-}a\text{-}b\text{-}c)TiO_2$, the relative dielectric constant $\epsilon_r$ is in the range of 17 to 75, a relatively high Q factor of 6,000 or more is exhibited, and the temperature coefficient $\tau_f$ of resonant frequency is in the range of ±30 ppm/° C., and thus it is possible to provide an excellent dielectric ceramic member in practical use.

frequency is in the range of ±15 ppm/° C., and thus it is possible to provide an excellent dielectric ceramic member more suitable for practical use.

EXAMPLE 2

An organic binder was added to each of the calcines obtained in Example 1 under Sample Nos. 1 to 38 which were within the ranges of the present invention, molding was performed to produce a rectangular column with a short side of 3 mm, a thickness of 3 mm, and a long side of 6 mm. Firing was performed in air at 1,200 to 1,400° C., and a rectangular columnar sintered member was thereby obtained.

Each rectangular columnar sintered member was immersed in an etchant bath containing hydrofluoric acid and hydrochloric acid at 60° C. to etch the surface thereof, and then a plating film with a thickness of 2 to 5 μm was formed thereon by electroless copper plating.

With respect to each sample, tuning was performed so as to achieve a desired frequency, and the non-loading Q factor was observed. In order to measure the adhesion strength to the plating film, using a wire bent into an L-shape, one end of the wire was soldered to the plating film in a square area of side length of 2 mm, and the other end of the wire was pulled perpendicular to the surface of the plating film. A force with which the plating film was peeled off the sintered member was measured.

The results thereof are shown in Table 4.

TABLE 4

| Sample No. | Non-loading Q factor | Adhesion strength [N/square with side of 2 mm] | Sample No. | Non-loading Q factor | Adhesion strength [N/square with side of 2 mm] |
|---|---|---|---|---|---|
| 1 | 350 | 80 | 20 | 410 | 110 |
| 2 | 510 | 110 | 21 | 380 | 90 |
| 3 | 520 | 120 | 22 | 390 | 115 |
| 4 | 530 | 120 | 23 | 460 | 120 |
| 5 | 380 | 85 | 24 | 450 | 115 |
| 6 | 500 | 105 | 25 | 470 | 110 |
| 7 | 490 | 120 | 26 | 380 | 95 |
| 8 | 440 | 100 | 27 | 390 | 100 |
| 9 | 460 | 115 | 28 | 410 | 100 |
| 10 | 390 | 100 | 29 | 420 | 105 |
| 11 | 350 | 95 | 30 | 410 | 110 |
| 12 | 400 | 95 | 31 | 420 | 120 |
| 13 | 460 | 120 | 32 | 390 | 95 |
| 14 | 470 | 125 | 33 | 370 | 100 |
| 15 | 450 | 120 | 34 | 430 | 120 |
| 16 | 470 | 130 | 35 | 390 | 95 |
| 17 | 420 | 100 | 36 | 400 | 100 |
| 18 | 430 | 105 | 37 | 430 | 120 |
| 19 | 480 | 125 | 38 | 390 | 90 |

A comparison of Sample Nos. 1 to 38 shows that, by appropriately selecting the element Re in $Re_2O_n$ and the composition ratio of $Re_2O_n$, it is possible to control the temperature coefficient $\tau_f$ of resonant frequency arbitrarily in the vicinity of 0 ppm/° C.

With respect to Sample Nos. 5 to 25 and Sample Nos. 27 to 31 in which a, b, and c, in mole percent, satisfy the preferable relationships $14.3 \leq a \leq 57.0$, $0.7 \leq b \leq 9.0$, and $0.7 \leq c \leq 10.0$, the relative dielectric constant $\epsilon_r$ is in the range of 19 to 52, a higher Q factor of 9,000 or more is exhibited, and the temperature coefficient $\tau_f$ of resonant As is obvious from Table 4, in each of Sample Nos. 1 to 38 which are within the ranges of the present invention, a satisfactory non-loading Q factor can be obtained, and a plating film with a high adhesion strength of 70 N or more per square with side of 2 mm can be formed on the surface of the dielectric ceramic member.

As described above, in accordance with the high-frequency dielectric ceramic member of the present invention, a relatively high Q factor can be obtained while controlling the relative dielectric constant $\epsilon_r$ in the range of 17 to 75. The temperature coefficient $\tau_f$ of resonant frequency can also be controlled in the vicinity of 0 ppm/° C. arbitrarily.

In accordance with the high-frequency dielectric ceramic member of the present invention, the adhesion strength of a plating film, such as a copper-plating film, formed on the high-frequency dielectric ceramic member can be increased to 70 N or more per square with side of 2 mm.

Consequently, for example, an internal conductor and an external conductor to be provided on the dielectric ceramic member can be formed using such copper-plating films, resulting in an improvement in productivity and a reduction in production costs of the dielectric ceramic member.

Moreover, as described above, if the adhesion strength of the plating film is increased, a gap at the interface between the dielectric ceramic member and the plating film is decreased. Consequently, when the high-frequency dielectric ceramic member is used for a dielectric resonator, a dielectric filter, or a dielectric duplexer, the energy loss can he decreased, resulting in an increase in the non-loading Q factor.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A high-frequency dielectric ceramic member comprising an oxide ceramic containing Mg, Ba, Re, Ti, and O, wherein Re is at least one element selected from the group consisting of La, Ce, Pr, Nd, Sm, Eu, Dy, and Er,
    wherein the oxide ceramic is represented by the formula $a\text{MgO}-b\text{BaO}-c\text{Re}_2\text{O}_n-(100-a-b-c)\text{TiO}_2$, wherein n=3 when Re is one of La, Nd, Sm, Eu, Dy, and Er, n=11/3 when Re is Pr, and n=4 when Re is Ce, wherein a, b, and c, in mole percent, satisfy the relationships $10.0 \leq a \leq 62.0$, $0 < b \leq 14.0$, and $0 < c \leq 16.5$.

2. A high-frequency dielectric ceramic member according to claim 1, wherein a, b, and c, in mole percent, satisfy the relationships $14.3 \leq a \leq 57.0$, $0.7 \leq b \leq 9.0$, and $0.7 \leq c \leq 10.0$.

3. A dielectric resonator comprising a dielectric ceramic member and an input-output terminal, the dielectric resonator operating by electromagnetic coupling between the dielectric ceramic member and the input-output terminal, wherein the dielectric ceramic member comprises a high-frequency dielectric ceramic member according to claim 1.

4. A dielectric resonator comprising a dielectric ceramic member and an input-output terminal, the dielectric resonator operating by electromagnetic coupling between the dielectric ceramic member and the input-output terminal, wherein the dielectric ceramic member comprises a high-frequency dielectric ceramic member according to claim 2.

5. A dielectric resonator according to claim 3, wherein the input-output terminal comprises a plated copper conductor disposed on a surface of the dielectric ceramic member.

6. A dielectric resonator according to claim 4, wherein the input-output terminal comprises a plated copper conductor disposed on a surface of the dielectric ceramic member.

7. A dielectric filter comprising a dielectric resonator according to claim 3 and external coupling means connected to the input-output terminal of the dielectric resonator.

8. A dielectric filter comprising a dielectric resonator according to claim 4 and external coupling means connected to the input-output terminal of the dielectric resonator.

9. A dielectric filter comprising a dielectric resonator according to claim 5 and external coupling means connected to the input-output terminal of the dielectric resonator.

10. A dielectric filter comprising a dielectric resonator according to claim 6 and external coupling means connected to the input-output terminal of the dielectric resonator.

11. A dielectric duplexer comprising:
    at least two dielectric filters;
    input-output connectors connected to the respective dielectric filters; and
    an antenna-connector connected to all the dielectric filters,
    wherein at least one of the dielectric filters is a dielectric filter according to claim 7.

12. A dielectric duplexer comprising:
    at least two dielectric filters;
    input-output connectors connected to the respective dielectric filters; and
    an antenna-connector connected to all the dielectric filters,
    wherein at least one of the dielectric filters is a dielectric filter according to claim 8.

13. A communication device comprising:
    a dielectric duplexer according to claim 11;
    a transmitter circuit connected to at least one of the input-output connectors of the dielectric duplexer;
    a receiver circuit connected to at least one of the input-output connectors of the dielectric duplexer that is not connected to the transmitter circuit; and
    an antenna connected to the antenna-connector of the dielectric duplexer.

14. A communication device comprising:
    a dielectric duplexer according to claim 12;
    a transmitter circuit connected to at least one of the input-output connectors of the dielectric duplexer;
    a receiver circuit connected to at least one of the input-output connectors of the dielectric duplexer that is not connected to the transmitter circuit; and
    an antenna connected to the antenna-connector of the dielectric duplexer.

15. A method of forming a high-frequency dielectric ceramic member, the method comprising:
    mixing powders to form an oxide ceramic mixture containing Mg, Ba, Re, Ti, and O, wherein Re is at least one element selected from the group consisting of La, Ce, Pr, Nd, Sm, Eu, Dy, and Er, wherein the oxide ceramic mixture is represented by the formula $a\text{MgO}-b\text{BaO}-c\text{Re}_2\text{O}_n-(100-a-b-c)\text{TiO}_2$, wherein n=3 when Re is one of La, Nd, Sm, Eu, Dy, and Er, n=11/3 when Re is Pr, and n=4 when Re is Ce, wherein a, b, and c, in mole percent, satisfy the relationships $10.0 \leq a \leq 62.0$, $0 < b \leq 14.0$, and $0 < c \leq 16.5$;
    adding an organic binder to the mixture;
    forming the mixture into a predetermined shape; and
    firing the shape to obtain a sintered member.

16. The method of forming a high-frequency dielectric ceramic member according to claim 15, wherein the powders are selected from the group consisting of MgO, $BaCO_3$, $La_2O_3$, $CeO_2$, $Pr_6O_{11}$, $Nd_2O_3$, $Sm_2O_3$, $Eu_2O_3$, $Gd_2O_3$, $Dy_2O_3$, $Er_2O_3$, and $TiO_2$ powders.

17. The method of forming a high-frequency dielectric ceramic member according to claim 15, wherein the mixture is calcined in air at 1,000 to 1,200° C. for 1 hour or more.

18. The method of forming a high-frequency dielectric ceramic member according to claim 15, wherein the firing is performed in air at 1,200 to 1,400° C.

19. The method of forming a high-frequency dielectric ceramic member according to claim 15, further comprising etching a surface of the sintered member.

20. The method of forming a high-frequency dielectric ceramic member according to claim 19, further comprising forming a plating film on the etched surface of the sintered member.

* * * * *